April 7, 1936.   W. S. HAMM   2,036,473
CURTAIN FIXTURE
Filed Nov. 22, 1935
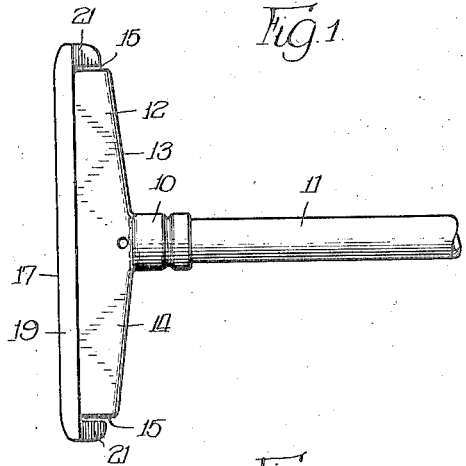
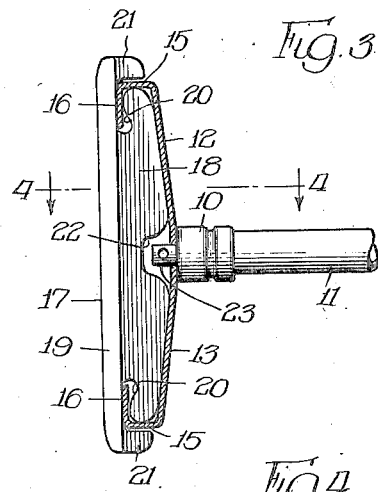
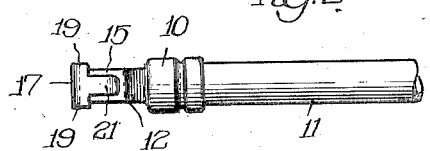
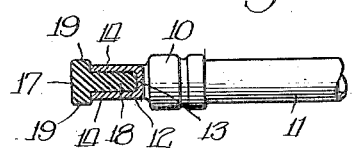
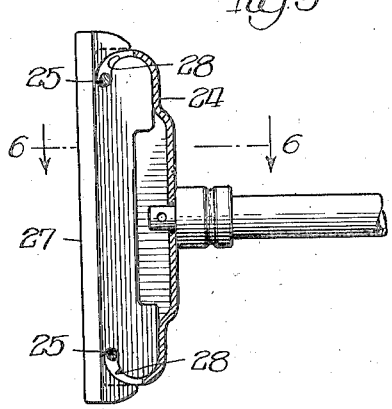
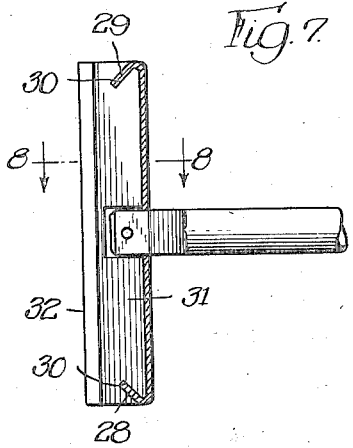
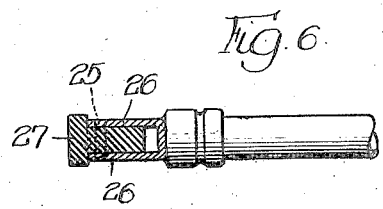
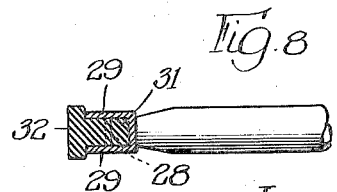
Inventor:
William S. Hamm,
By Cromwell, Greist & Warden
attys Patented Apr. 7, 1936

2,036,473

UNITED STATES PATENT OFFICE 2,036,473

CURTAIN FIXTURE

William S. Hamm, Elkhart, Ind., assignor to The Adlake Company, Chicago, Ill., a corporation of Illinois Application November 22, 1935, Serial No. 51,050

6 Claims. (Cl. 156—26)

This invention has to do with curtain fixtures of the type wherein the outwardly spring-pressed heads at the ends of the fixture are equipped with facing strips of rubber or other suitable material for frictional engagement with the guides.

The object of the invention is to provide a facing strip which may be quickly and easily applied to or removed from the head and yet cannot come loose or work out of position while in service.

In order that the invention may be readily understood, three different forms of the same are presented herein, but it will of course be appreciated that such forms have been chosen primarily for the purpose of exemplification and that the invention is susceptible of embodiment in still other structurally modified forms coming equally within the scope of the appended claims.

In the accompanying drawing:

Fig. 1 is a side view of a curtain fixture head equipped with a replaceable facing strip, in accordance with the invention;

Fig. 2 is a top view of the head;

Fig. 3 is a vertical section through the center of the head;

Fig. 4 is a horizontal section, taken on the line 4—4 of Fig. 3;

Fig. 5 is a vertical section through a modified head structure, showing another form of the invention;

Fig. 6 is a horizontal section, taken on the line 6—6 of Fig. 5;

Fig. 7 is a vertical section through another modified head structure, showing still another form of the invention; and Fig. 8 is a horizontal section, taken on the line 8—8 of Fig. 7.

The head shown in Figs. 1 to 4 inclusive is made of sheet metal and is provided with a sleeve portion 10 which is journaled on a stem 11. The outer portion 12 of the head is vertically elongated, tapers toward its upper and lower ends, is U-shaped in cross section throughout substantially its entire length, and opens outwardly toward the guide against which the head is adapted to bear. The back 13, sides 14 and ends 15 of the outer portion 12 of the head are closed, and the ends 15 are provided with inturned lips 16 which are disposed flush with the edges of the sides 14.

The head is equipped with a soft rubber facing strip 17 which, instead of being riveted or otherwise fixedly secured in position, is removably seated in the shallow trough-like pocket or recess present in the outer portion 12 of the head. The strip 17 is somewhat longer than the head and is T-shaped in cross section, with a center rib 18 and side flanges 19. When the strip 17 is in position the rib 18 fills up the recess in the head and abuts against the back 13 of the head throughout a substantial area and the side flanges 19 abut against the outer edges of the sides 14 and ends 15, with the ends of the strip projecting beyond the ends of the head. The rib 18 of the rubber strip is provided near its ends with L-shaped slots 20, into which the correspondingly shaped ends 15 and lips 16 of the head are adapted to fit. The strip 17 can be sprung into or out of locked position in the head by grasping the strip and bowing out the center of the same far enough to move the ends toward each other and allow the L-shaped slots 20 to be drawn clear of the lips 16. After the strip 17 has been allowed to straighten out, however, into its normal operating position, no force met with in service will ever dislodge it. The extreme ends 21 of the rib 18 beyond the ends 15 of the head provide excellent bumpers for the head. To facilitate bowing or arching of the strip 17 in applying or removing it from the head, the rib 18 is preferably provided with a notch 22 at the center of the strip, which notch allows the strip to be bent outwardly at its center without any difficulty and at the same time provides needed clearance for the inner adjusting tip 23 of the stem 11. The flanges 19 along the sides of the strip 17 give the latter somewhat greater width than the supporting metal parts of the head, with the result that only the strip 17 can contact with the sides of the groove in the guide.

In the form of the invention which is illustrated in Figs. 5 and 6 the ends of the head 24 are cut away and cross pins 25 are mounted in the side walls 26 of the head adjacent the ends of the side walls. The rubber facing strip 27 which fits into the head is provided near its ends with curved slots 28 which afford, with the pins 25, connections between the facing strip and the head.

In the modification which is shown in Figs. 7 and 8, the ends 29 of the head are turned inwardly at an angle away from the ends of the side walls 29 and fit into correspondingly shaped slots 30 in the ends of the rib 31 on the back of the facing strip 32.

I claim:

1. In a curtain fixture, a metal head, a rubber facing strip for the head, and interlocking formations on the head and strip which normally hold the strip in correct position relative to the head but permit removal of the strip upon deformation of the latter.

2. In a curtain fixture, a metal head, a rubber facing strip for the head, and oppositely facing L-shaped joint connections between the ends of the head and the ends of the strip which normally hold the strip in correct position relative to the head but permit removal of the strip upon an arching of the latter intermediate said connections.

3. In a curtain fixture, a vertically elongated sheet metal head of U-shaped cross section which opens toward the guide with which it is adapted to coact, and a rubber facing strip for the head having a rib at its back which fits within the head and flanges at its sides which fit against the edges of the sides of the head, said head being provided interiorly of the same with cross members which are spaced from the back of the head adjacent the ends of the latter, and said strip being provided with slots in the rib portion thereof which interfit with the cross members in such fashion as to block both endwise and outward movement of the strip bodily relative to the head.

4. In a curtain fixture, a vertically elongated sheet metal head of U-shaped cross section which is tapered toward its upper and lower ends and opens throughout a substantial part of its length toward the guide with which it is adapted to coact, and a rubber facing strip for the head having a rib at its back which fits within the head and flanges at its sides which fit against and project beyond the edges of the sides of the head, said head being provided with inturned lips on its ends, and said strip being provided with L-shaped slots in the rib portion thereof which interfit with the lips and the ends of the head whereby to prevent both endwise and outward movement of the strip bodily relative to the head.

5. In a curtain fixture, a head, a deformable contact member for the head, and interlocking formations on the head and contact member which normally hold the latter in correct position relative to the head but permit removal of the contact member upon deformation of the same.

6. A contact member for the head of a curtain fixture, consisting of a rubber strip which is provided adjacent its ends with oppositely facing L-shaped slots.

WILLIAM S. HAMM.